US009829693B2

(12) United States Patent
Kono

(10) Patent No.: US 9,829,693 B2
(45) Date of Patent: Nov. 28, 2017

(54) IMAGE ACQUISITION DEVICE

(71) Applicant: OLYMPUS CORPORATION, Tokyo (JP)

(72) Inventor: Takayuki Kono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 450 days.

(21) Appl. No.: 14/330,352

(22) Filed: Jul. 14, 2014

(65) Prior Publication Data

US 2015/0022653 A1 Jan. 22, 2015

(30) Foreign Application Priority Data

Jul. 22, 2013 (JP) .................................. 2013-151496

(51) Int. Cl.
*H04N 5/20* (2006.01)
*G02B 21/36* (2006.01)
(Continued)

(52) U.S. Cl.
CPC ......... *G02B 21/362* (2013.01); *G02B 21/361* (2013.01); *G02B 21/367* (2013.01);
(Continued)

(58) Field of Classification Search
USPC .......................................................... 348/79
See application file for complete search history.

(56) References Cited

U.S. PATENT DOCUMENTS 5,668,660 A * 9/1997 Hunt .................... G02B 21/025
359/363
5,764,408 A * 6/1998 Otaki ................... G02B 21/082
359/368
(Continued)

FOREIGN PATENT DOCUMENTS

JP H06-233060 A 8/1994
JP H09-186917 A 7/1997
JP 2004-282551 A 10/2004

OTHER PUBLICATIONS

Extended European Search Report dated Nov. 24, 2014 from related European Application No. 14 17 6113.0.

*Primary Examiner* — Mikhail Itskovich
(74) *Attorney, Agent, or Firm* — Scully, Scott, Murphy & Presser, P.C.

(57) ABSTRACT

A image acquisition device including a connection section having an opening; an optical-path switching unit that changes an optical path of light entering from the opening; and two image acquisition elements. The optical-path switching unit includes two parallel reflective surfaces disposed with a distance therebetween and is swivelable about a swivel axis such that the reflective surface is insertable into and withdrawable from an incident optical axis. The first image acquisition element is disposed on the incident optical axis at the opposite side of the opening with the optical-path switching unit interposed therebetween. The second image acquisition element is disposed at a position where the second image acquisition element acquires an image of the light that has been deflected by the two reflective surfaces and is tilted about central axes of the two image acquisition elements relative to a straight line extending orthogonally to the central axes.

11 Claims, 10 Drawing Sheets

(51) Int. Cl.
*H04N 5/225* (2006.01)
*H04N 9/04* (2006.01)

(52) U.S. Cl.
CPC ......... *H04N 5/2254* (2013.01); *H04N 5/2258* (2013.01); *H04N 9/045* (2013.01)

(56) References Cited

U.S. PATENT DOCUMENTS

| | | | | |
|---|---|---|---|---|
| 2006/0227414 | A1* | 10/2006 | Hashimoto | G02B 21/248 359/381 |
| 2007/0268574 | A1* | 11/2007 | Sasaki | G02B 21/0032 359/385 |
| 2012/0300053 | A1 | 11/2012 | Kono | |
| 2013/0155479 | A1 | 6/2013 | Kono et al. | |

* cited by examiner

IMAGE ACQUISITION DEVICE

CROSS REFERENCE TO RELATED APPLICATIONS

This application is based on Japanese Patent Application No. 2013-151496, the contents of which are incorporated herein by reference.

TECHNICAL FIELD

The present invention relates to image acquisition devices.

BACKGROUND ART

A known image acquisition device in the related art includes two image acquisition elements and splits light from a subject so as to acquire two kinds of images by means of the two image acquisition elements (for example, see Patent Literature 1).

This image acquisition device splits a light beam by using an optical-path splitting means, such as a half mirror, and acquires two kinds of images at different magnifications simultaneously by using the two image acquisition elements. Another type of image acquisition device switches between optical paths of a light beam by using an optical-path switching means and acquires an image by using one of two image acquisition elements.

CITATION LIST

Patent Literature

{PTL 1}
Japanese Unexamined Patent Application, Publication No. Hei 9-186917

SUMMARY OF INVENTION

Solution to Problem

An aspect of the invention provides an image acquisition device including a connection section connectable to an observation apparatus and having an opening that receives a light beam from the observation apparatus; an optical-path switching unit that changes an optical path of light entering along an incident optical axis extending through the opening; and two image acquisition elements each acquiring an image of the light traveling through the optical path changed by the optical-path switching unit. The optical-path switching unit includes two parallel reflective surfaces disposed with a distance therebetween and is swivelable about a swivel axis extending parallel to the incident optical axis such that a first one of the reflective surfaces is insertable into and withdrawable from the incident optical axis. A first one of the image acquisition elements is disposed on the incident optical axis at an opposite side of the opening with the optical-path switching unit interposed therebetween. A second one of the image acquisition elements is disposed next to the first image acquisition element at a position where the second image acquisition element acquires the image of the light that has been deflected by the two reflective surfaces of the optical-path switching unit, the first reflective surface of which is inserted in the incident optical axis, and is tilted about central axes of the two image acquisition elements relative to a straight line extending orthogonally to the central axes.

DESCRIPTION OF EMBODIMENT

An image acquisition device 1 according to an embodiment of the present invention will be described below with reference to the drawings.

Figure 1:
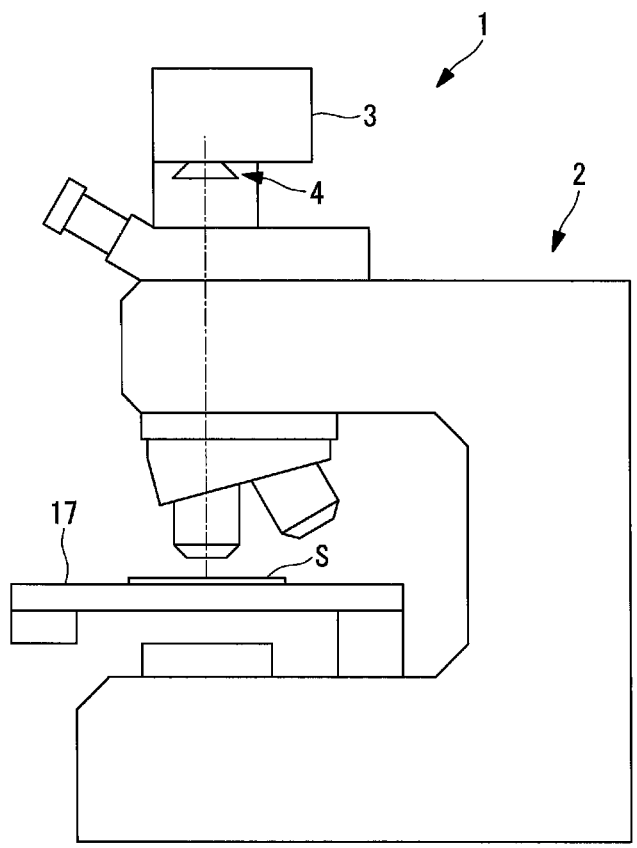
FIG. 1 illustrates the overall configuration of a microscope equipped with an image acquisition device according to an embodiment of the present invention.
Figure 2:
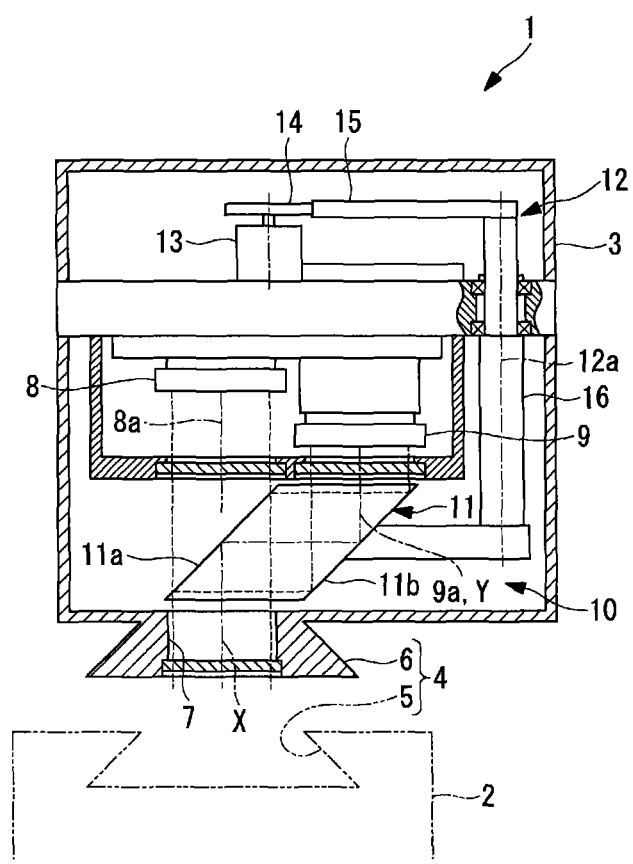
FIG. 2 is a vertical sectional view of the image acquisition device according to this embodiment mounted on the microscope in FIG. 1.

The image acquisition device 1 according to this embodiment is an image acquisition device 1 for a microscope (observation apparatus) 2 and includes a housing 3 and a connection section 4 for detachably attaching the housing 3 to the microscope 2, as shown in FIG. 1. For example, as shown in FIG. 2, the connection section 4 has a dovetail 6 that engages with a dovetail groove 5 provided in the microscope 2. The connection section 4 is not limited to the dovetail 6 and the dovetail groove 5; another freely-chosen connection method may be employed.

Furthermore, the image acquisition device 1 according to this embodiment includes an opening 7 that is provided in the connection section 4 and through which light from a sample S collected by the microscope 2 enters the housing 3, a first image acquisition element 8 and a second image acquisition element 9 that each acquire an image of the light entering along an incident optical axis X via the opening 7, and an optical-path switching mechanism 10 that switches between optical paths extending from the opening 7 to the image acquisition elements 8 and 9.

For example, the two image acquisition elements 8 and 9, which have different properties, are a color CCD (first image acquisition element) 8 having high color reproducibility and a monochromatic CCD (second image acquisition element) 9 whose sensitivity is higher than that of the color CCD 8.

In this embodiment, described below, a point projected onto a light-receiving surface of the color CCD 8 will be defined as an optical axis $8a$, and a point projected onto a light-receiving surface of the monochromatic CCD 9 will be defined as an optical axis $9a$.

The color CCD 8 is fixed to the housing 3 such that the optical axis (central axis) $8a$ extending perpendicularly to the light-receiving surface of the color CCD 8 is aligned with the incident optical axis X of the opening 7 provided in the connection section 4.

The monochromatic CCD 9 has the optical axis (central axis) $9a$ extending perpendicularly to the light-receiving surface thereof and disposed parallel to the optical axis $8a$ of the color CCD 8 with a distance therebetween.

Figure 3:
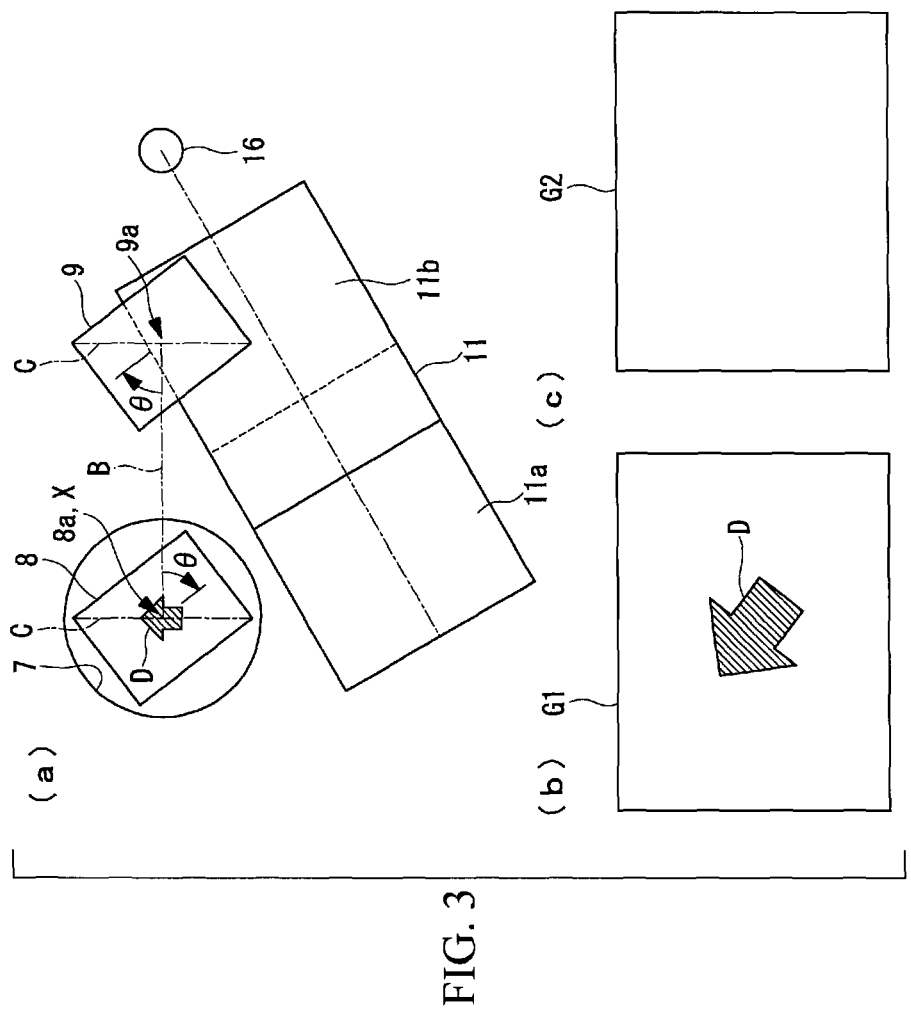
FIG. 3 includes a plan view (a) showing the positional relationship between two image acquisition elements and a prism, a diagram (b) showing a color image, and a diagram (c) showing a monochromatic image in a case where a color image is to be acquired by the image acquisition device in FIG. 1.

As shown in FIG. 3($a$), the color CCD 8 and the monochromatic CCD 9 are rotated in the same direction by the same angle $\theta$ about the optical axes $8a$ and $9a$ so as to be tilted at the angle $\theta$ relative to a straight line B extending orthogonally to the optical axes $8a$ and $9a$. As shown in FIG. 3($a$), the CCDs 8 and 9 are disposed such that diagonal lines C thereof are orthogonal to the straight line B.

The optical-path switching mechanism 10 includes a prism (optical-path switching unit) 11 and a swiveling mechanism 12 that supports the prism 11 in a swivelable manner about a swivel axis $12a$ extending parallel to the optical axes $8a$ and $9a$ of the color CCD 8 and the monochromatic CCD 9.

The prism 11 is a parallelepiped prism 11 having a first reflective surface $11a$ and a second reflective surface $11b$ that are disposed parallel to each other with a distance therebetween.

When the swiveling mechanism 12 is activated, the prism 11 becomes disposed at a 45° angle relative to the optical axis $8a$ on the incident optical axis X of a light beam entering the first reflective surface $11a$ from the opening 7, that is, the optical axis $8a$ of the color CCD 8 fixed in alignment with the incident optical axis X, thereby deflecting the light beam by 90°. Since the two reflective surfaces $11a$ and $11b$ are disposed parallel to each other with a distance therebetween, the second reflective surface $11b$ is disposed at a 45° angle relative to the optical axis of the light beam deflected by the first reflective surface $11a$.

Consequently, in the prism 11, the light beam deflected by the first reflective surface $11a$ is deflected again by 90° by the second reflective surface $11b$. Specifically, the light beam entering the prism 11 is deflected twice, each time by 90°, so as to be bent in the shape of a crank by the prism 11, whereby the light beam is emitted along an emission optical axis Y that is accurately parallel to the incident optical axis X.

The distance between the incident optical axis X and the emission optical axis Y of the prism 11 is designed to be equal to the distance between the optical axes $8a$ and $9a$ of the color CCD 8 and the monochromatic CCD 9.

Figure 4:
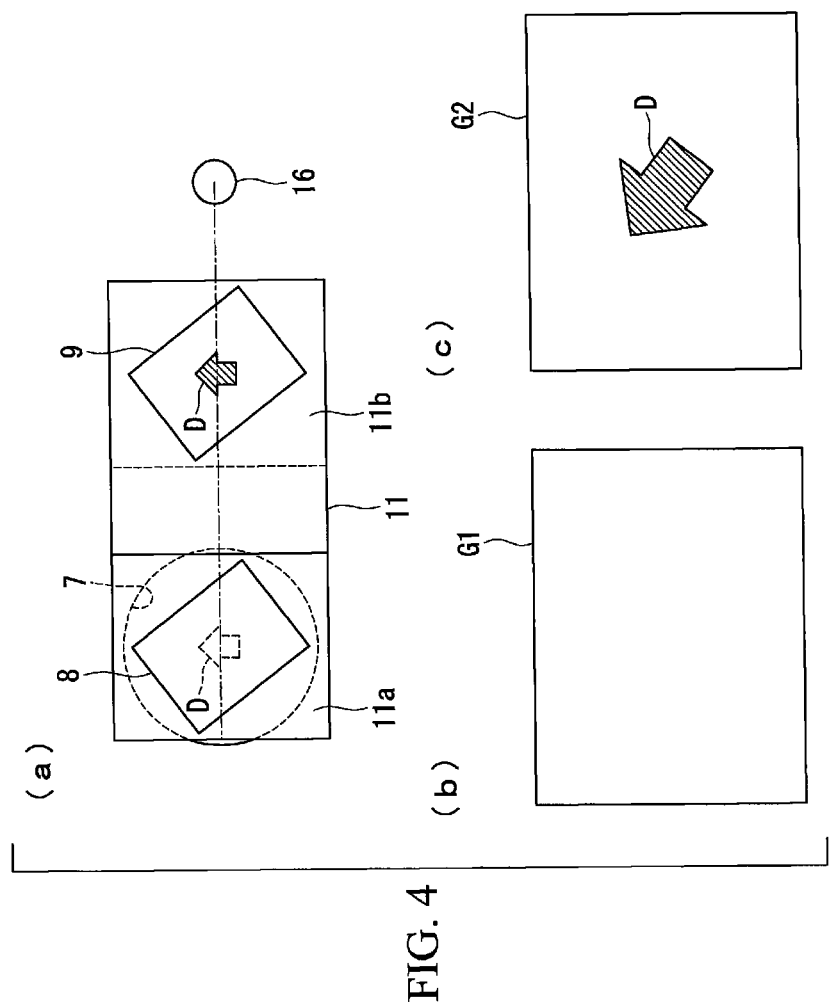
FIG. 4 includes a plan view (a) showing the positional relationship between the two image acquisition elements and the prism, a diagram (b) showing a color image, and a diagram (c) showing a monochromatic image in a case where a monochromatic image is to be acquired by the image acquisition device in FIG. 1.

Furthermore, as shown in FIGS. 3 and 4, the swiveling mechanism 12 swivels the prism 11 so as to insert and withdraw the prism 11 into and from the space between the opening 7 and the color CCD 8. The swiveling mechanism 12 includes a stepping motor 13, gears 14 and 15, a drive shaft 16 fixed to the prism 11, and a controller (not shown) that controls the stepping motor 13.

The operation of the image acquisition device 1 according to this embodiment having the above-described configuration will be described below.

In order to acquire an image of the light from the sample S collected by the microscope 2 by using the image acquisition device 1 according to this embodiment, the image acquisition device 1 is first attached to the microscope 2 by means of the connection section 4.

Then, the sample S is placed on a stage 17 of the microscope 2 and the swiveling mechanism 12 is activated so that the prism 11 is withdrawn from the space between the opening 7 and the color CCD 8, as shown in FIG. 3($a$). Thus, the light entering the housing 3 from the microscope 2 via the opening 7 directly enters the color CCD 8 without traveling through the prism 11, so that a color image G1 of the sample is acquired, as shown in FIG. 3($b$). Since all of the light entering the housing 3 enters the color CCD, a monochromatic image G2 is not acquired by the monochromatic CCD 9, as shown in FIG. 3($c$).

Subsequently, as shown in FIG. 4($a$), the swiveling mechanism 12 is activated so that the prism 11 is inserted into the space between the opening 7 and the color CCD 8. Thus, the light entering the housing 3 from the microscope 2 via the opening 7 is deflected twice by the prism 11 so as to enter the monochromatic CCD 9. Consequently, as shown in FIG. 4($c$), the monochromatic image G2 of the sample S is acquired. In this case, since the optical path extending to the color CCD 8 is blocked by the reflective surface $11a$ of the prism 11, an image of the sample S is not formed in the color image G1, as shown in FIG. 4($b$).

In this case, in the image acquisition device 1 according to this embodiment, since the prism 11 has the two parallel reflective surfaces $11a$ and $11b$, the phase of the monochromatic image G2 acquired by the monochromatic CCD 9 as the result of the change by the two reflective surfaces $11a$ and $11b$ matches the phase of the color image G1 even if the prism 11 is in the process of being swiveled. Therefore, even when the prism 11 is not swiveled accurately, the color image G1 and the monochromatic image G2 are acquired as images with the same phase without being rotated relatively to each other. As a result, image processing for superimposing the acquired images G1 and G2 can be readily performed.

When the prism 11 is swiveled, the optical path of the light entering the housing 3 via the opening 7 is switched between the optical path extending to the color CCD 8 and the optical path extending to the monochromatic CCD 9 during the swiveling process of the prism 11. Specifically, of the light entering the housing 3 via the opening 7, a component thereof reflected by the first reflective surface 11a is partially directed toward the second reflective surface 11b without entering the color CCD 8. Then, if the monochromatic CCD 9 exists on the optical path deflected by the second reflective surface 11b, a monochromatic image G2 is acquired.

With regard to the images G1 and G2 acquired by the CCDs 8 and 9, a region-of-interest D, as indicated by oblique lines in FIG. 3, is often a small area located near the center of the image G1 (for the sake of convenience, the region-of-interest D is shown as an arrow-shaped area in the drawing). Therefore, if the prism 11 is swiveled for switching to an observation mode based on the monochromatic image G2 while the color image G1 acquired by the color CCD 8 is being observed, the region-of-interest D in the color image G1 is preferably observable immediately after switching to the monochromatic image G2.

Figure 5:
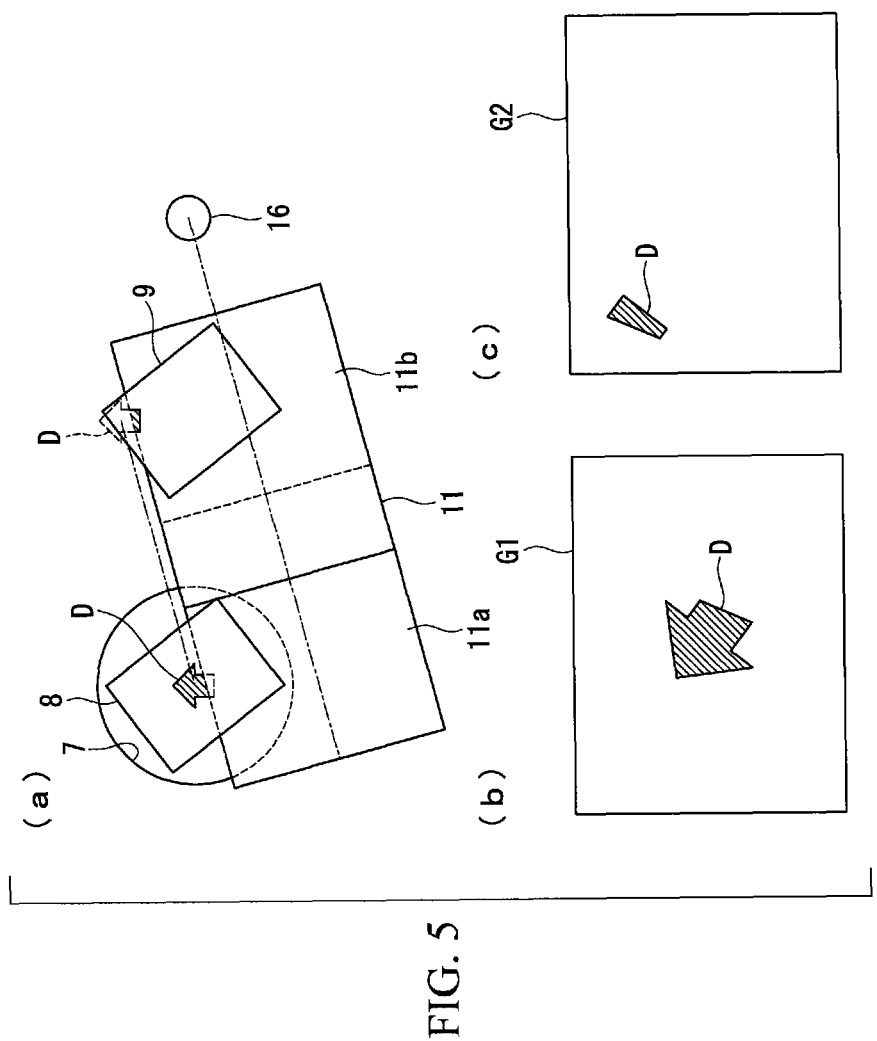
FIG. 5 includes a plan view (a) showing the positional relationship between the two image acquisition elements and the prism, a diagram (b) showing a color image, and a diagram (c) showing a monochromatic image when optical paths are being switched by the image acquisition device in FIG. 1.

In the image acquisition device 1 according to this embodiment, since the monochromatic CCD 9 is tilted relative to the straight line B connecting the central axes 8a and 9a of the two CCDs 8 and 9 and the direction of the diagonal line C of the monochromatic CCD 9 is orthogonal to the straight line B, one corner of the monochromatic CCD 9, which is substantially rectangular, protrudes in the swiveling direction of the prism 11. As a result, as shown in FIG. 5(a), when the optical paths are switched and the light from the region-of-interest D begins to enter the reflective surface 11a of the prism 11, the light reflected by the reflective surface 11b immediately starts to enter the monochromatic CCD 9. The color image G1 and the monochromatic image G2 in this case are as shown in FIGS. 5(b) and 5(c).

Figure 6:
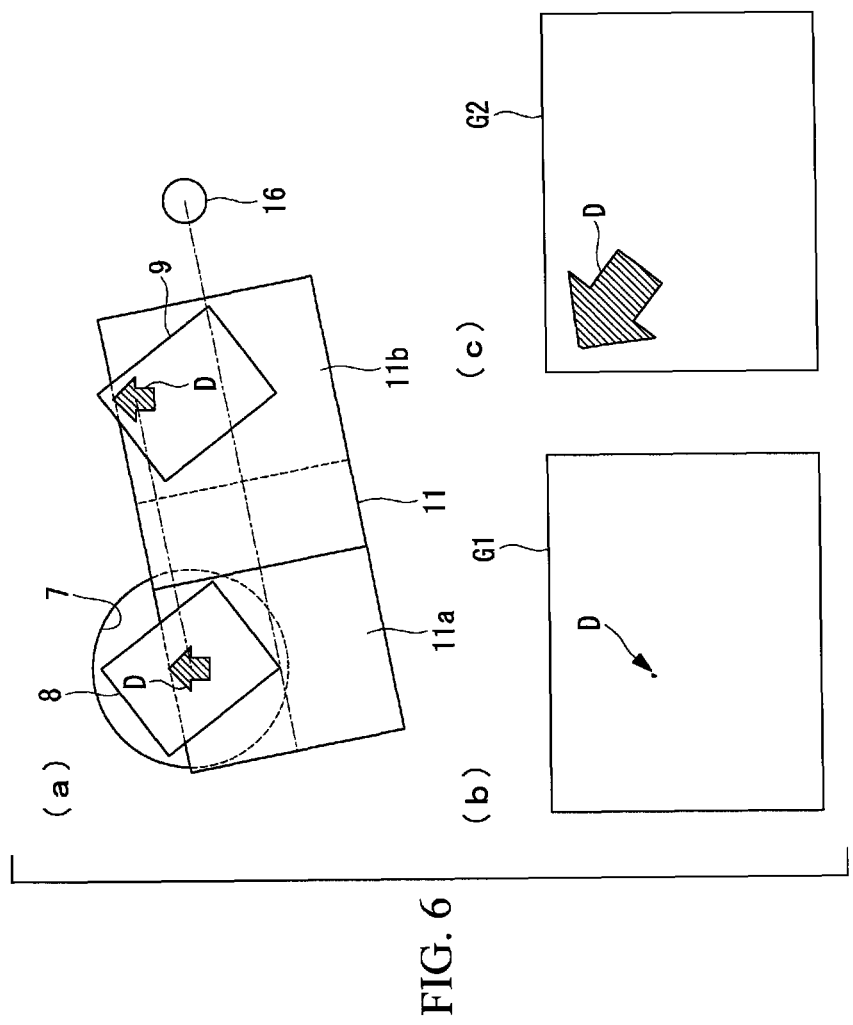
FIG. 6 includes a plan view (a) showing the positional relationship between the two image acquisition elements and the prism, a diagram (b) showing a color image, and a diagram (c) showing a monochromatic image immediately after the optical paths are switched by the image acquisition device in FIG. 1.

As shown in FIG. 6(a), in a state where the light from the region-of-interest D traveling toward the color CCD 8 is substantially entirely blocked by the reflective surface 11a, an image of the region-of-interest D is not formed in the color image G1, as shown in FIG. 6(b). On the other hand, all of the light blocked by the reflective surface 11a enters the monochromatic CCD 9 so that a monochromatic image G2 including the entire region-of-interest D is acquired, as shown in FIG. 6(c). Consequently, every time the optical paths are switched, the image of the region-of-interest D is acquired by either of the CCDs 8 and 9, thereby preventing the problem of losing sight of the region-of-interest D during the optical-path switching process.

Furthermore, the acquisition of the image of the region-of-interest D by the monochromatic CCD 9 can be advantageously performed even when the prism 11 is swiveled only to the position shown in FIG. 6(a) for some reason.

Figure 7:
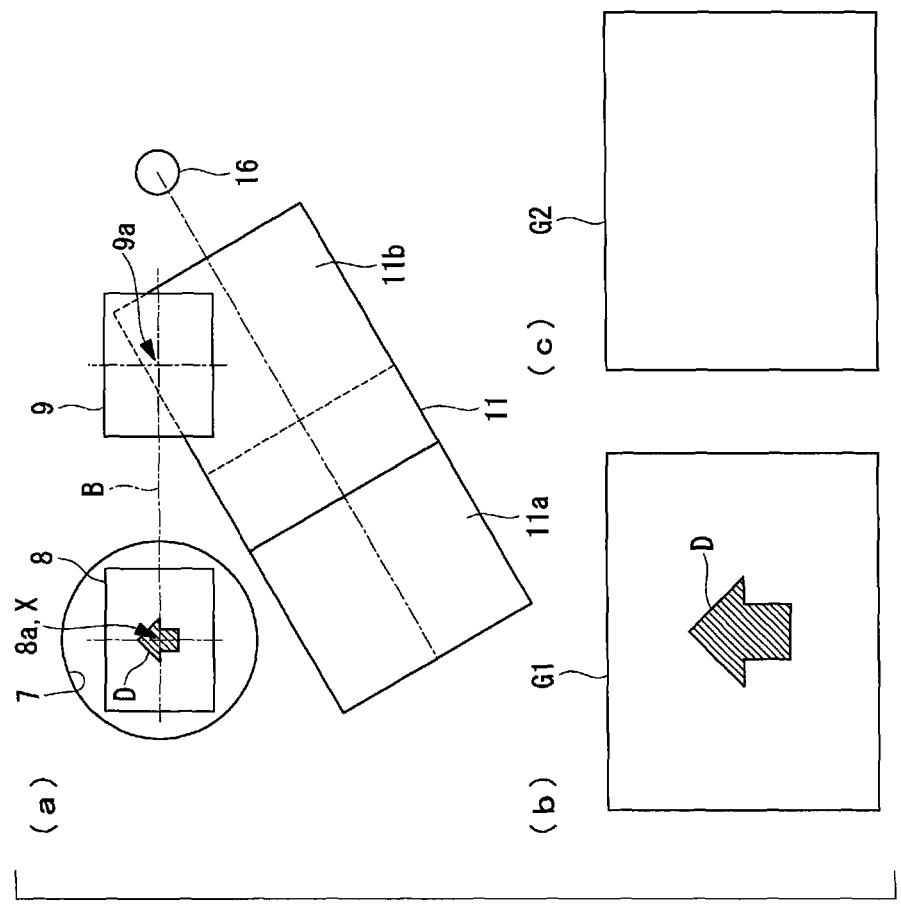
FIG. 7 includes a plan view (a) showing the positional relationship between two image acquisition elements and a prism, a diagram (b) showing a color image, and a diagram (c) showing a monochromatic image when a color image is to be acquired by an image acquisition device of a reference example.
Figure 8:
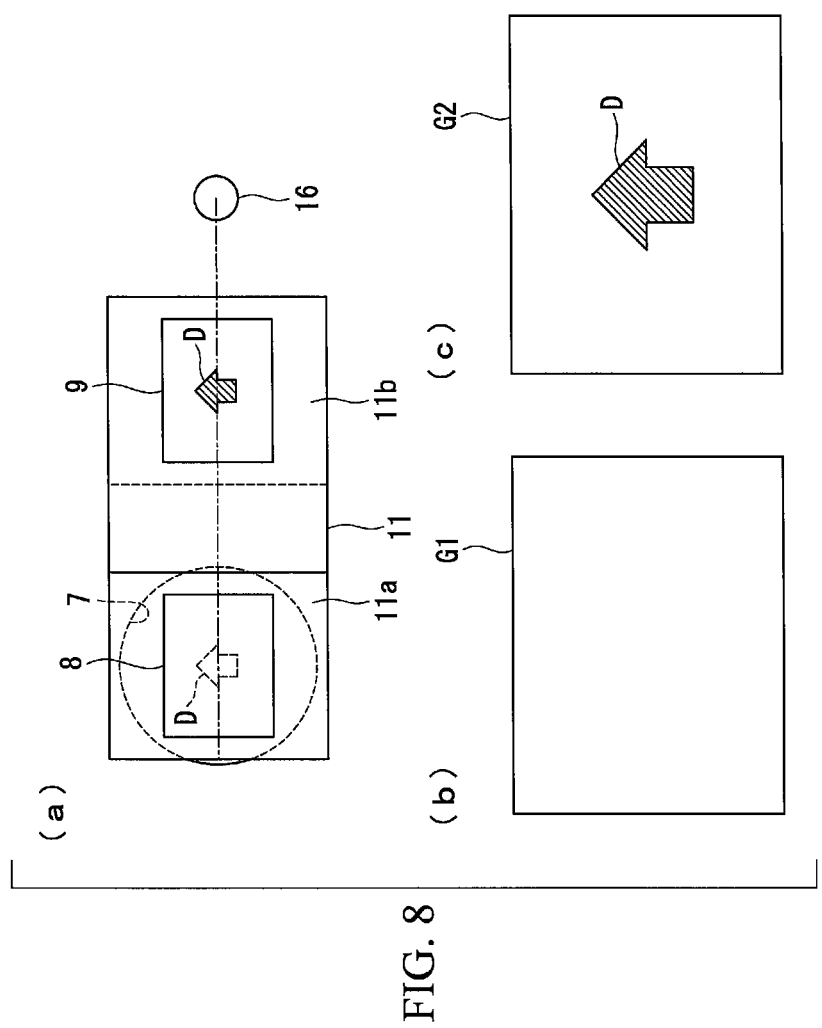
FIG. 8 includes a plan view (a) showing the positional relationship between the two image acquisition elements and the prism, a diagram (b) showing a color image, and a diagram (c) showing a monochromatic image in a case where a monochromatic image is to be acquired by the image acquisition device of the reference example.
Figure 9:
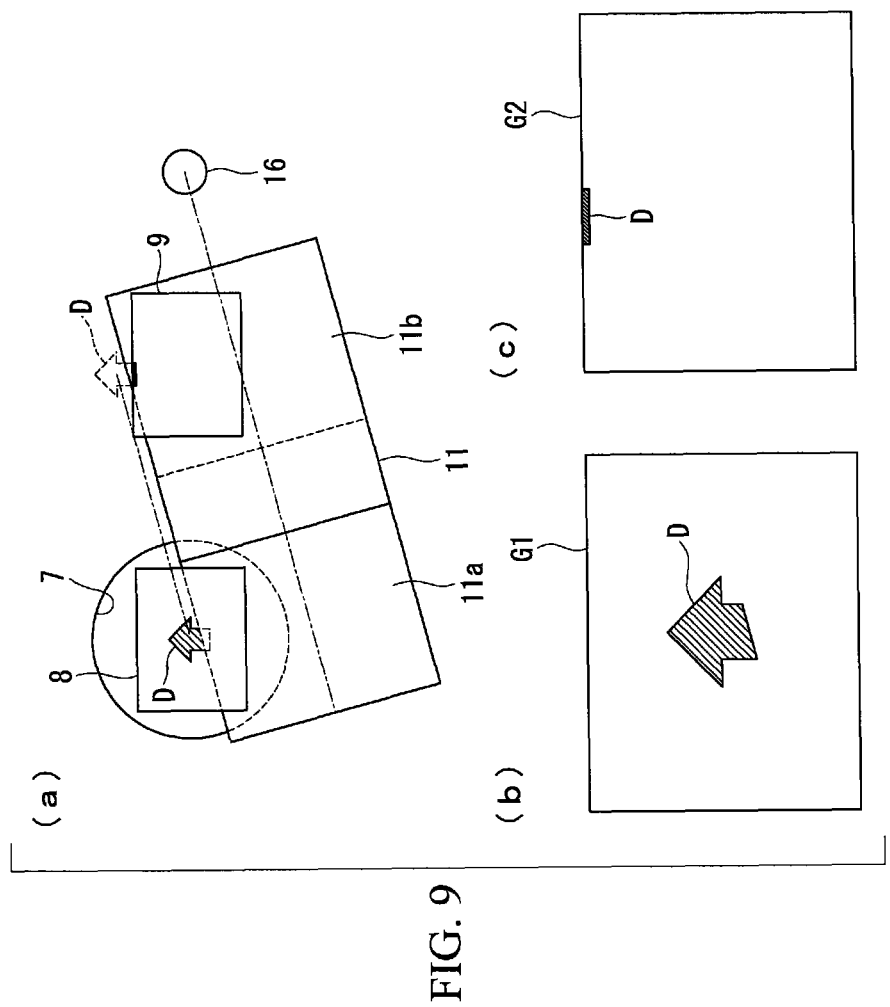
FIG. 9 includes a plan view (a) showing the positional relationship between the two image acquisition elements and the prism, a diagram (b) showing a color image, and a diagram (c) showing a monochromatic image when optical paths are being switched by the image acquisition device of the reference example.

In contrast, it is assumed that the CCDs 8 and 9 are arranged without being tilted relative to the straight line B extending orthogonally to the central axes 8a and 9a thereof, as in a reference example shown in FIGS. 7 and 8. In this case, even if the prism 11 is swiveled by an angle equal to that in the image acquisition device 1 according to this embodiment, as shown in FIG. 9, when the region-of-interest D in the color image G1 begins to have a missing part immediately after starting the optical-path switching process, the missing part is unlikely to appear in the monochromatic image G2.

Figure 10:
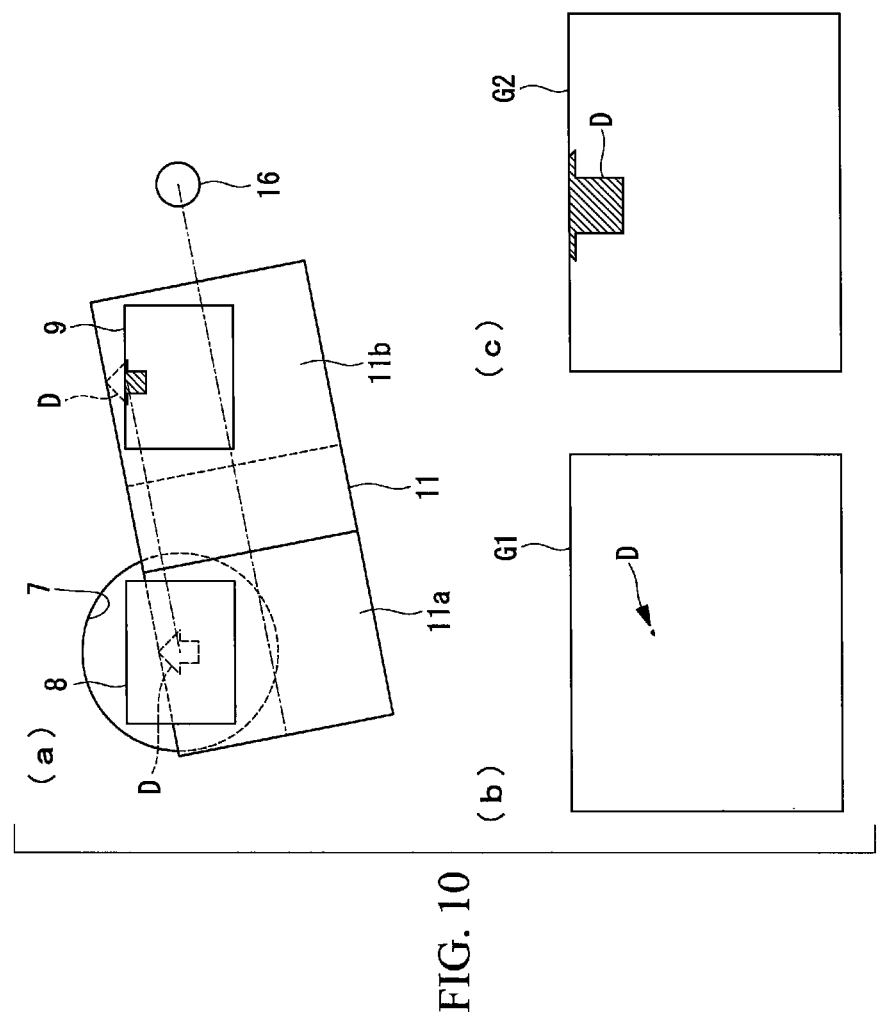
FIG. 10 includes a plan view (a) showing the positional relationship between the two image acquisition elements and the prism, a diagram (b) showing a color image, and a diagram (c) showing a monochromatic image immediately after the optical paths are switched by the image acquisition device of the reference example.

Furthermore, as shown in FIG. 10, when the region-of-interest D in the color image G1 is substantially lost, only a portion of the region-of-interest D appears in the monochromatic image G2. Therefore, in this case, it is not possible to carry on with continuous observation of the region-of-interest D during the optical-path switching process. Moreover, if the prism 11 is swiveled only halfway for some reason, there would be a problem in that the region-of-interest D cannot be sufficiently observed.

Specifically, it is clear from a comparison between FIG. 6(c) and FIG. 10(c) that, in the image acquisition device 1 according to this embodiment, even if the position reproducibility of the prism 11 is low when acquiring an image using the monochromatic CCD 9, there is a high possibility that the region-of-interest D set at the color CCD 8 can be displayed immediately after the image acquisition mode using the color CCD 8 is switched to the image acquisition mode using the monochromatic CCD 9, as compared with the image acquisition device of the above-described reference example. As a result, with the image acquisition device 1 according to this embodiment, there is a low possibility of losing sight of the image of the region-of-interest D even when performing switching between the image acquisition mode using the color CCD 8 and the image acquisition mode using the monochromatic CCD 9, thereby advantageously allowing a satisfactory image acquisition process to be performed.

In the image acquisition device 1 according to this embodiment, although the color CCD 8 and the monochromatic CCD 9 are both rotated in the same direction by the same angle, the configuration is not limited thereto; it is acceptable to rotate the monochromatic CCD 9 alone, or the rotational angle may be varied. Furthermore, although the rotational angle 9 is set such that the diagonal lines C are orthogonal to the straight line B extending orthogonally to the central axes 8a and 9a of the two CCDs 8 and 9, the configuration is not limited thereto. As long as the two CCDs 8 and 9 are tilted relative to the straight line B, the advantage according to the tilt angle thereof can be achieved.

Furthermore, although a color CCD is used as the first image acquisition element 8 and a monochromatic CCD is used as the second image acquisition element 9 in this embodiment, the configuration is not limited thereto. Alternatively, a monochromatic CCD may be used as the first image acquisition element 8, and a color CCD may be used as the second image acquisition element 9.

Although two image acquisition elements are used in this embodiment, the configuration is not limited thereto. Alternatively, three or more image acquisition elements may be used.

Although a parallelepiped prism 11 is used as an optical-path switching unit, an optical-path switching unit equipped with two parallel mirrors facing each other may be used as an alternative.

From the above-described embodiment, the following inventions are derived.

An aspect of the invention provides an image acquisition device including a connection section connectable to an observation apparatus and having an opening that receives a light beam from the observation apparatus; an optical-path switching unit that changes an optical path of light entering along an incident optical axis extending through the opening; and two image acquisition elements each acquiring an image of the light traveling through the optical path changed by the optical-path switching unit. The optical-path switching unit includes two parallel reflective surfaces disposed with a distance therebetween and is swivelable about a swivel axis extending parallel to the incident optical axis such that a first one of the reflective surfaces is insertable into and withdrawable from the incident optical axis. A first one of the image acquisition elements is disposed on the incident optical axis at an opposite side of the opening with the optical-path switching unit interposed therebetween. A second one of the image acquisition elements is disposed next to the first image acquisition element at a position where the second image acquisition element acquires the image of the light that has been deflected by the two reflective surfaces of the optical-path switching unit, the first reflective surface of which is inserted in the incident optical axis, and is tilted about central axes of the two image acquisition elements relative to a straight line extending orthogonally to the central axes.

According to this aspect, when the connection section is connected to the observation apparatus, a light beam from the observation apparatus enters the image acquisition device along the incident optical axis via the opening provided in the connection section. When the optical-path switching unit is swiveled so as to withdraw the reflective surfaces from the incident optical axis, the light beam entering along the incident optical axis enters the first image acquisition element, whereby a first image is acquired.

When the optical-path switching unit is swiveled about the swivel axis so as to set the reflective surfaces on the incident optical axis, the light beam entering along the incident optical axis is deflected twice by the two reflective surfaces and enters the second image acquisition element, whereby a second image is acquired. Consequently, images of the same subject can be acquired by switching between the two image acquisition elements.

In this case, the optical path extending to the first image acquisition element and the optical path extending to the second image acquisition element are switched gradually by swiveling the optical-path switching unit. Specifically, an image acquisition mode using the first image acquisition element in which the optical-path switching unit is withdrawn from the incident optical axis switches to an image acquisition mode using the second image acquisition element in which the optical-path switching unit is swiveled such that the first reflective surface is disposed at a position where it blocks the entire light beam entering along the incident optical axis.

With regard to the image acquired by each image acquisition element, a region-of-interest is often a small region located near the center of the image. Therefore, at a point when the optical-path switching unit is swiveled to a position where a light beam from the region-of-interest entirely enters the first reflective surface, it is preferable that the light beam deflected twice by the two reflective surfaces has entirely entered the second image acquisition element.

According to this aspect, the second image acquisition element is tilted relative to the straight line extending orthogonally to the central axes of the two image acquisition elements so that any one of the corners of the image acquisition element protrudes in the swiveling direction of the optical-path switching unit. Thus, when the optical-path switching unit is swiveled to the position where the light beam from the region-of-interest entirely enters the first reflective surface, the image of the light beam from the region-of-interest can be acquired by the second image acquisition element at an earlier stage than in a case where the image acquisition element is not tilted.

As a result, the problem of losing sight of the region-of-interest when switching between optical paths by swiveling the optical-path switching unit can be reduced. Moreover, in a case where the optical-path switching unit is not sufficiently swiveled, the image of the region-of-interest acquired by the second image acquisition element can be prevented from having missing parts as much as possible.

In the above aspect, the two image acquisition elements may be tilted in the same direction by the same angle relative to the straight line.

Accordingly, the phase of an image acquired by the first image acquisition element without the intervention of the optical-path switching unit matches the phase of an image acquired by the second image acquisition element via the two parallel reflective surfaces of the optical-path switching unit, so that image processing, such as combining, can be readily performed.

Furthermore, in the above aspect, the two image acquisition elements may be disposed such that diagonal lines thereof are orthogonal to the straight line.

Accordingly, any one of the corners of the second image acquisition element can protrude maximally in the swiveling direction of the optical-path switching unit, thereby minimizing the problem of losing sight of the region-of-interest.

REFERENCE SIGNS LIST

1 image acquisition device
2 microscope (observation apparatus)
3 dovetail (connection section)
4 opening
7 color CCD (first image acquisition element)
8 monochromatic CCD (second image acquisition element)
9 prism (optical-path switching unit)
11a, 11b reflective surface
16 drive shaft (swivel axis)
B straight line
C diagonal line
X incident optical axis

The invention claimed is:
1. An image acquisition device comprising:
a first image sensor comprising a first rectangular light receiving surface perpendicular to a first optical axis,
wherein the first image sensor is configured to detect light along the first optical axis that is incident on the first rectangular light receiving surface;
a second image sensor comprising a second rectangular light receiving surface perpendicular to a second optical axis, wherein the second optical axis is parallel to the first optical axis,
wherein the second image sensor is configured to detect light along the second optical axis that is incident on the second rectangular light receiving surface, and
wherein the second image sensor is positioned such that one of four sides of the second rectangular light receiving surface is tilted at a first non-zero angle relative to a straight line, wherein the straight line is orthogonal to the first optical axis and the second optical axis, and the straight line connects the first optical axis and the second optical axis;
a first reflective surface and a second reflective surface parallel to the first reflective surface; and
a swivel mechanism configured to swivel the first reflective surface and the second reflective surface about a swivel axis parallel to the first optical axis from a first position to a second position,
wherein in the first position, light along the first optical axis is incident on the first rectangular light receiving surface without being deflected by the first reflective surface and the second reflective surface, and
wherein in the second position, light along the first optical axis is deflected by the first reflective surface, is subsequently deflected by the second reflective surface to be incident on the second rectangular light receiving surface along the second optical axis.

2. The image acquisition device according to claim 1,
wherein the second image sensor is positioned such that the one of the four sides of the second rectangular light receiving surface is tilted at the first non-zero angle in a predetermined direction,
wherein the first image sensor is positioned such that a corresponding one of four sides of the first rectangular light receiving surface is tilted in the predetermined direction at a second non-zero angle relative to the straight line, wherein the straight line is orthogonal to the first optical axis and the second optical axis, and the straight line connects the first optical axis and the second optical axis, and
wherein the first non-zero angle is the same as the second non-zero angle.

3. The image acquisition device according to claim 2, wherein the first image sensor and the second image sensor are positioned such that:
a first diagonal line of a rectangle formed by the four sides of the first rectangular light receiving surface, and
a second diagonal line of a rectangle formed by the four sides of the second rectangular light receiving surface,
are orthogonal to the straight line.

4. The image acquisition device according to claim 1,
wherein the second image sensor is positioned such that the one of the four sides of the second rectangular light receiving surface is tilted at the first non-zero angle in a predetermined direction,
wherein the first image sensor is positioned such that a corresponding one of four sides of the first rectangular light receiving surface is tilted in the predetermined direction at a second non-zero angle relative to the straight line, wherein the straight line is orthogonal to the first optical axis and the second optical axis, and the straight line connects the first optical axis and the second optical axis, and
wherein the first non-zero angle is different from the second non-zero angle.

5. The image acquisition device according to claim 1, wherein the first reflective surface and the second reflective surface are embodied in a parallelepiped prism.

6. The image acquisition device according to claim 1, wherein the first reflective surface and the second reflective surface comprise two parallel mirrors facing each other.

7. The image acquisition device according to claim 1,
wherein the first image sensor comprises one of a color charge-coupled device and a monochrome charge-coupled device, and
wherein the second image sensor comprises the other of the color charge-coupled device and the monochrome charge-coupled device.

8. The image acquisition device according to claim 1, further comprising:
a housing configured to house the first image sensor, the second image sensor, the first reflective surface, the second reflective surface, and the swivel mechanism,
wherein the housing is configured to be connected to an observation apparatus configured to collect light from a sample, and
wherein the housing is configured to define an opening through which light enters the housing along an incident optical axis to be detected by the first image sensor and the second image sensor.

9. The image acquisition device according to claim 8, wherein the first optical axis is aligned with the incident optical axis.

10. A system comprising:
the image acquisition device according to claim 8; and
the observation apparatus.

11. The system according to claim 10, wherein the observation apparatus comprises a microscope.

* * * * *